US012565208B2

(12) United States Patent　　　(10) Patent No.: US 12,565,208 B2
　　Grelaud et al.　　　　　　　　　(45) Date of Patent: Mar. 3, 2026

(54) PREDICTIVE CURVE SPEED CONTROLLER

(71) Applicant: Robert Bosch GmbH, Stuttgart (DE)

(72) Inventors: Mathieu Grelaud, Ludwigsburg (DE);
Daniel Vetter, Plymouth, MI (US)

(73) Assignee: Robert Bosch GmbH, Stuttgart (DE)

( * ) Notice: Subject to any disclaimer, the term of this
patent is extended or adjusted under 35
U.S.C. 154(b) by 238 days.

(21) Appl. No.: 18/469,329

(22) Filed: Sep. 18, 2023

(65) Prior Publication Data

US 2025/0091577 A1　　Mar. 20, 2025

(51) Int. Cl.
*B60W 30/16*　　　(2020.01)
*B60W 10/06*　　　(2006.01)
*B60W 10/18*　　　(2012.01)
*B60W 30/045*　　(2012.01)

(52) U.S. Cl.
CPC ............ *B60W 30/16* (2013.01); *B60W 10/06*
(2013.01); *B60W 10/18* (2013.01); *B60W
30/045* (2013.01); *B60W 2420/408* (2024.01);
*B60W 2552/30* (2020.02); *B60W 2554/80*
(2020.02); *B60W 2710/0666* (2013.01); *B60W
2710/182* (2013.01)

(58) Field of Classification Search
CPC ...... B60W 30/16; B60W 10/06; B60W 10/18;
B60W 30/045; B60W 2420/408; B60W
2552/30; B60W 2554/80; B60W
2710/0666; B60W 2710/182
See application file for complete search history.

(56) References Cited

U.S. PATENT DOCUMENTS

| | | | |
|---|---|---|---|
| 6,265,991 B1* | 7/2001 | Nishiwaki | ............... G01S 7/295 |
| | | | 340/904 |
| 10,730,516 B2 | 8/2020 | Ohashi et al. | |
| 2015/0293216 A1* | 10/2015 | O'Dea | ................... B60W 30/02 |
| | | | 701/23 |
| 2018/0170388 A1* | 6/2018 | Shin | ..................... B60W 60/001 |
| 2021/0188270 A1 | 6/2021 | Horn | |
| 2021/0253128 A1 | 8/2021 | Nister et al. | |
| 2022/0073068 A1 | 3/2022 | Lavi et al. | |
| 2022/0250620 A1* | 8/2022 | Hu | ......................... B60W 10/06 |
| 2022/0340203 A1 | 10/2022 | Iizuka et al. | |
| 2023/0011130 A1 | 1/2023 | Fukasawa et al. | |
| 2023/0202473 A1* | 6/2023 | Shalev-Shwartz | ........................... |
| | | | B60W 30/146 |
| | | | 701/93 |

FOREIGN PATENT DOCUMENTS

| | | | | |
|---|---|---|---|---|
| CN | 113104034 A | * | 7/2021 | ............ B60W 30/14 |
| DE | 102009046908 A1 | * | 5/2011 | ........... G01C 21/365 |

* cited by examiner

*Primary Examiner* — Aniss Chad
*Assistant Examiner* — Nikki Marie M Molina
(74) *Attorney, Agent, or Firm* — Michael Best &
Friedrich LLP

(57) ABSTRACT

A controller for a motor vehicle includes an electronic
processor configured to receive sensor data from one or
more sensors, process the sensor data to generate targets
indicative of objects around the motor vehicle, plot the
targets on a coordinate system representing space around the
motor vehicle, generate a representation of a route ahead of
the vehicle based on the plotted targets, analyze the repre-
sentation of the route to determine whether a curve in a road
is present ahead of the motor vehicle, and generate an
instruction to reduce a speed of the motor vehicle in
response to determining that the curve is present.

12 Claims, 5 Drawing Sheets

202 — Scan environment around ego vehicle with one or more sensors

204 — Process the sensor data to generate targets

206 — Classify targets as stationary or moving

208 — Plot targets on a coordinate system representing space around the ego vehicle 210 — Generate polynomial-based representations of a route ahead of the ego vehicle based on the plotted targets

PREDICTIVE CURVE SPEED CONTROLLER

FIELD

The present disclosure relates to vehicles and, more particularly, to driver assistance systems for motor vehicles.

SUMMARY

Motor vehicles use so-called advanced driver assistance systems (ADASs) for example, lane keep and adaptive cruise control systems to help drivers keep their vehicle centered within lane markings and/or maintain safe distances between their vehicle and other vehicles. Some examples of adaptive cruise control systems include a curve speed controller. Curve speed controllers may use vehicle sensors such as accelerometers and/or gyroscopes to monitor real-time lateral acceleration of the vehicle and determine when the vehicle enters a curved portion of the road. Curve speed controllers may command the vehicle to decelerate in response to detecting the vehicle entering a curve for example, in response to detecting the lateral acceleration exceeding a threshold. However, curve speed controllers may be reactive in that they command the vehicle to decelerate only after detecting that the vehicle has already entered the curve. In situations where the vehicle quickly enters a curve with a small radius, the curve speed controller may detect a high level of lateral acceleration and command high levels of deceleration to slow the vehicle. Such high levels of deceleration may be uncomfortable for the occupants and/or cause wear and tear on vehicle components such as brake pads and rotors. Thus, what is needed are adaptive cruise control systems that are able to predict curves ahead of the vehicle and smoothly slow the vehicle before it enters the curve. Such systems may increase the overall comfort of the vehicle occupants and may prolong the service life of components such as brake pads and rotors by reducing the wear and tear associated with frequent abrupt deceleration commands.

A controller for a motor vehicle includes an electronic processor configured to receive sensor data from one or more sensors, process the sensor data to generate targets indicative of objects around the motor vehicle, plot the targets on a coordinate system representing space around the motor vehicle, generate a representation of a route ahead of the vehicle based on the plotted targets, analyze the representation of the route to determine whether a curve in a road is present ahead of the motor vehicle, and generate an instruction to reduce a speed of the motor vehicle in response to determining that the curve is present.

In other features, generating instructions to reduce the speed of the motor vehicle comprises generating a virtual target ahead of the motor vehicle and generating a command to follow the virtual target. In other features, generating instructions to reduce the speed of the motor vehicle comprises reducing a speed of the virtual target to a first speed. The first speed is less than a current speed of the motor vehicle. In other features, the first speed is determined based on a radius of the curve. In other features, generating a command to follow the virtual target includes generating a command to maintain a distance between the virtual target and the motor vehicle.

In other features, the representation of the route is a polynomial representation. In other features, the electronic processor is configured to classify each target as stationary or moving. In other features, the one or more sensors includes a radar sensor and classifying each target as stationary or moving includes classifying each target based on a Doppler shift of the target. In other features, the instructions to reduce the speed of the motor vehicle include increasing a brake pressure. In other features, the instructions to reduce the speed of the motor vehicle include modifying a torque output of an engine to decrease the speed of the motor vehicle.

A method for controlling a motor vehicle includes processing sensor data to generate targets indicative of objects around the motor vehicle, plotting the targets on a coordinate system representing space around the motor vehicle, generating a representation of a route ahead of the vehicle based on the plotted targets, analyzing the representation of the route to determine whether a curve in a road is present ahead of the motor vehicle, and generating an instruction to reduce a speed of the motor vehicle in response to determining that the curve is present.

In other features, generating instructions to reduce the speed of the motor vehicle comprises generating a virtual target ahead of the motor vehicle and generating a command to follow the virtual target. In other features, generating instructions to reduce the speed of the motor vehicle comprises reducing a speed of the virtual target to a first speed. The first speed is less than a current speed of the motor vehicle. In other features, the first speed is determined based on a radius of the curve. In other features, generating a command to follow the virtual target includes generating a command to maintain a distance between the virtual target and the motor vehicle.

In other features, the representation of the route is a polynomial representation. In other features, the method includes classifying each target as stationary or moving. In other features, the one or more sensors includes a radar sensor and classifying each target as stationary or moving includes classifying each target based on a Doppler shift of the target. In other features, the instructions to reduce the speed of the motor vehicle include increasing a brake pressure. In other features, the instructions to reduce the speed of the motor vehicle include modifying a torque output of an engine to decrease the speed of the motor vehicle.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Figure 1:
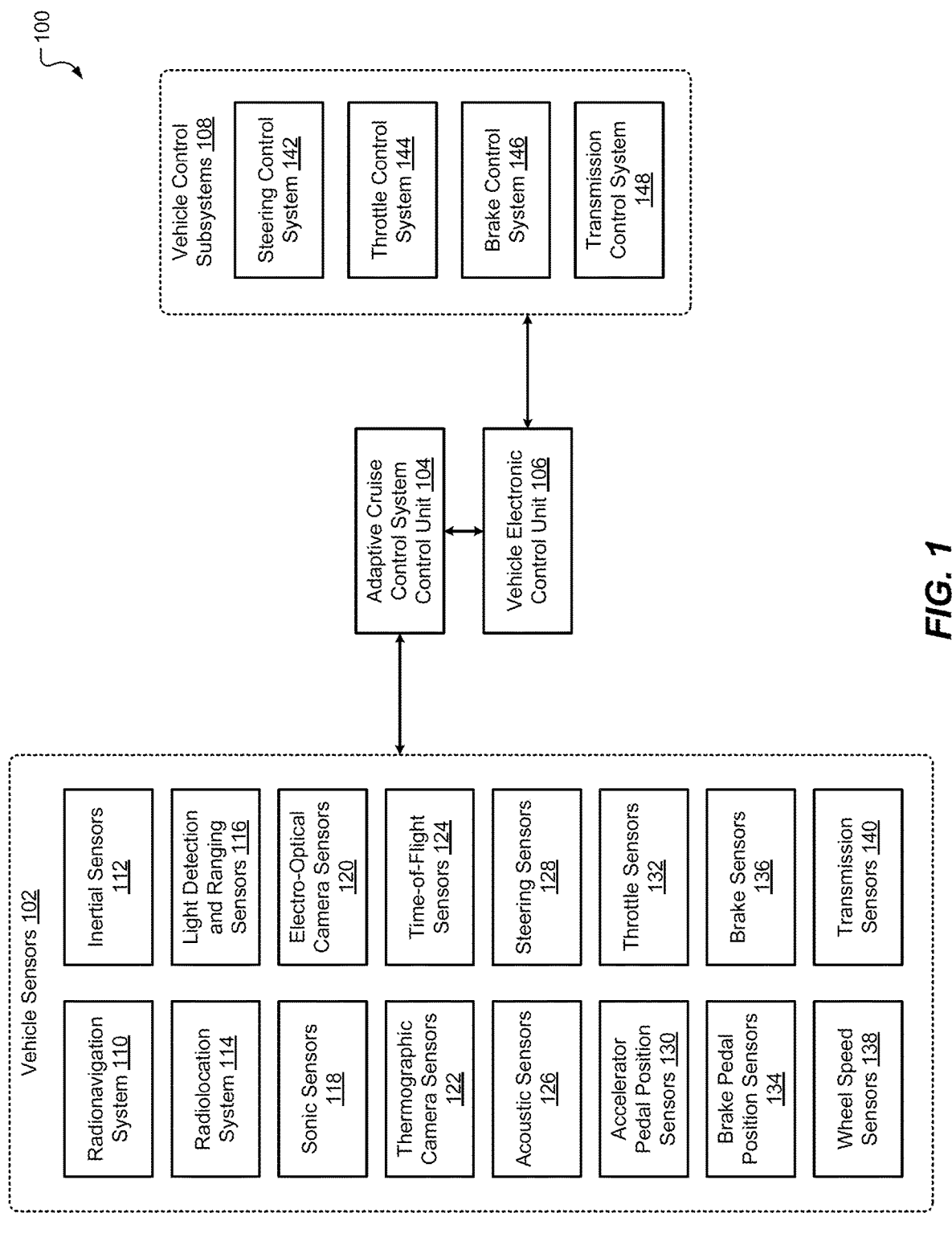
FIG. 1 is a block diagram of an example system for controlling a motor vehicle.

FIG. 1 is a block diagram of an example system 100 for controlling a motor vehicle. As shown in the example of FIG. 1, the system 100 may include one or more vehicle sensors 102, an adaptive cruise control system control unit 104, a vehicle electronic control unit 106, and one or more vehicle control subsystems 108. In some embodiments, the adaptive cruise control system control unit 104 includes one or more electronic processors and memory, for example, one or more memory modules (including non-transitory computer-readable storage media). The one or more memory modules may include one or more executable instructions that the one or more electronic processors are configured to execute. Similarly, the vehicle electronic control unit 106 includes one or more electronic processors and memory, for example, one or more memory modules (including non-transitory computer-readable storage media). The one or more memory modules may include one or more executable instructions that the one or more electronic processors are configured to execute. While the adaptive cruise control system control unit 104 and vehicle electronic control unit 106 are shown as units in FIG. 1, adaptive cruise control system control unit 104 and vehicle electronic control unit 106 may be combined into a single unit or split across multiple units.

In various implementations, the vehicle sensors 102, the adaptive cruise control system control unit 104, the vehicle electronic control unit 106, and the vehicle control subsystems 108 may be interconnected via one or more internal communications networks, such as one or more vehicle buses. For example, the components of the system 100 may be interconnected with physical transmission media, such as electrical wiring and/or optical fibers. In some embodiments, the components of the system 100 may be interconnected using one or more networks types, protocols, and/or standards, such as: the Automotive Audio Bus (A2B) protocol, the Avionics Full-Duplex Switched Ethernet (ARINC 664) protocol, the Mark33 Digital Information Transfer System (ARINC 429) protocol, the Byteflight protocol, a Controller Area Network (CAN), a Domestic Digital Bus (D2B), the FlexRay protocol, the IEEE 1394 standard, an Inter Equipment Bus (IEBus), an Inter-Integrated Circuit (I2C), the ISO 9141-1/−2 standards, the SAE J1508 standard, the SAE J1587 standard, the SAE J1850 standard, the SAE J1939 standard, the ISO 11783 standard, the Keyword Protocol 2000 (KWP2000), a Local Interconnect Network (LIN), the Media Oriented Systems Transport (MOST) interface, a Multifunction Vehicle Bus, a Serial Peripheral Interface (SPI), a Vehicle Area Network (VAN), the Cyphal protocol, the Ethernet protocol, and/or the Internet protocol suite (TCP/IP).

As shown in the example of FIG. 1, system 100 may include one or more vehicle sensors 102 for gathering data about the vehicle's internal state, the vehicle's external environment, and/or the vehicle's interactions with the external environment. The one or more vehicle sensors 102 may include a radionavigation system 110, inertial sensors 112, a radiolocation system 114, light detection and ranging sensors 116, sonic sensors 118, electro-optical camera sensors 120, thermographic camera sensors 122, time-of-flight sensors 124, acoustic sensors 126, steering sensors 128, accelerator pedal position sensors 130, throttle sensors 132, brake pedal position sensors 134, brake sensors 136, wheel speed sensors 138, and/or transmission sensors 140. In various implementations, the radionavigation system 110 includes a receiver for a satellite-based radionavigation system, for example, a global navigation satellite system (GNSS). The receiver may receive geolocation and time information from the GNSS and calculate a two- or three-dimensional position of the receiver. In some examples, the GNSS may be the Global Positioning System (GPS). In some embodiments, the inertial sensors 112 include a combination of accelerometers, gyroscopes, and/or magnetometers. The inertial sensors 112 may measure and report the vehicle's specific force or acceleration, angular rate, and/or orientation. In various implementations, the inertial sensors 112 may include a one-, two-, or three-axis accelerometer, a one-, two-, or three-axis gyroscope, and/or a one-, two-, or three-axis magnetometer.

The radiolocation system 114 may include transmitters and/or receivers that use radio waves to determine the distance, angle, and/or radial velocity of objects relative to the radiolocation system 114. In some embodiments, the radiolocation system 114 includes a radar system, such as a frequency-modulated continuous-wave (FMCW) radar or an impulse radar. The light detection and ranging sensors 116 may include a transmitter that targets an object with a laser and measures the time it takes for the reflected laser light to return to a receiver. In some examples, the sonic sensors 118 include acoustic sensors that generate sound energy, transmit sound energy to a target, and measure the time interval between the emission and return of a sound pulse to determine a distance to the target. In various implementations, the sonic sensors 118 include ultrasonic sensors. In some examples, the ultrasonic sensors operate in a frequency range of between about 20 kHz to about 250 kHz.

In various implementations, the electro-optical camera sensors 120 include an electro-optical camera that includes an optical lens and a solid-state image sensor. The electro-optical camera may digitally record images from the image sensor. In some examples, the electro-optical camera sensors 120 capture and record still images and/or motion video based on light in the visible spectrum. In some embodiments, the thermographic camera sensors 122 include a thermographic camera that includes an optical lens and a solid-state image sensor. The solid-state image sensor digitally records images from the image sensor. In various implementations, the thermographic camera sensors 122 capture and record still images and/or motion video based on light in the infrared and/or near-infrared spectrum.

In some examples, the time-of-flight sensors 124 include a range imaging camera system for measuring distances between the camera system and a target. The camera system may measure distances between each point of an image taken and the camera system based on a round trip time of a light signal such as a laser or light emitted by an LED. In various implementations, the acoustic sensors 126 include one or more microphones and/or microphone arrays and identify a presence of acoustic signatures indicative of emergency conditions such as acoustic signatures indicative of a presence of emergency vehicles. In some embodiments, the acoustic sensors 126 may be used to estimate whether the emergency vehicles are closing with the acoustic sensors 126 or traveling away from the acoustic sensors 126 by identifying Doppler shifts in the acoustic signatures.

The steering sensors 128 may include steering angle sensors that sense a steering wheel's rate of turn and/or an angle of the steering wheel. In various implementations, the steering sensors 128 include a torque sensor that measures an amount of force being applied by a driver to the steering wheel. The accelerator pedal position sensors 130 may include a sensor used to monitor the position of the accelerator pedal. The throttle sensors 132 may include a sensor used to monitor the air intake of the vehicle's engine. In some examples, the brake sensors 136 include sensors that measure the position of brake actuators. In some embodiments, the brake sensors 136 include sensors that measure the clamp force of the brake calipers against the brake rotor. In various implementations, the wheel speed sensors 138 include a sensor for measuring the speed of vehicle wheel rotation. In some examples, wheel speed sensors 138 may include a tachometer for measuring engine speed. The transmission sensors 140 may include a sensor for detecting gear selection and/or transmission speed.

As illustrated in FIG. 1, the system 100 may also include one or more vehicle control subsystems 108 that manage and/or control operation of the vehicle. The vehicle control subsystems 108 may include a steering control system 142, a throttle control system 144, a brake control system 146, and/or a transmission control system 148. In various implementations, the steering control system 142 generates and sends commands to the motor of an electric power steering system to control steering inputs of the vehicle. In some instances, the steering control system 142 may generate and send commands to electric motors of a steer-by-wire system to control steering inputs of the vehicle. The throttle control system 144 may generate and send commands to an electronic throttle control unit of the vehicle for opening and/or closing a throttle of a vehicle or, more generally, controlling acceleration of a vehicle. In a hybrid or electric vehicle, the throttle control system 144 may generate and send commands to power inverter modules of electric drive motors of the vehicle.

The brake control system 146 may generate and send commands to control the pumps, vacuum servos, and/or master cylinders of the vehicle brake system. In various implementations, the brake control system 146 may generate and send commands to control actuators of electro-mechanical calipers. In various implementations, the brake control system 146 may generate and send commands to the control system of the electric drive motors of the vehicle to reconfigure the motors to function as generators. The transmission control system 148 may control how and when the vehicle transmission shifts gears. In various implementations, the transmission control system 148 generates and sends commands to the vehicle transmission to perform gear changes.

In various implementations, adaptive cruise control system control unit 104 receives data from vehicle sensors 102. As previously discussed, vehicle sensors 102 may collect data about the vehicle's internal state, the vehicle's external environment, and/or the vehicle's interactions with the external environment. In some embodiments, vehicle sensors 102 collect data at regular intervals over a time period. Adaptive cruise control system control unit 104 may process the data to interpret the vehicle's surroundings and understand the vehicle's current status. Based on the processed data, adaptive cruise control system control unit 104 may command vehicle electronic control unit 106 to control the vehicle using vehicle control subsystems 108. In various implementations, adaptive cruise control system control unit 104 includes a curve speed controller, and the curve speed controller performs one or more portions of the processes described below with reference to the flowcharts.

Figure 2:
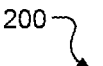
FIG. 2 is a flowchart of an example process for automatically monitoring vehicle sensors and generating a representation of a road ahead of a vehicle based on sensor data.
Figure 2:
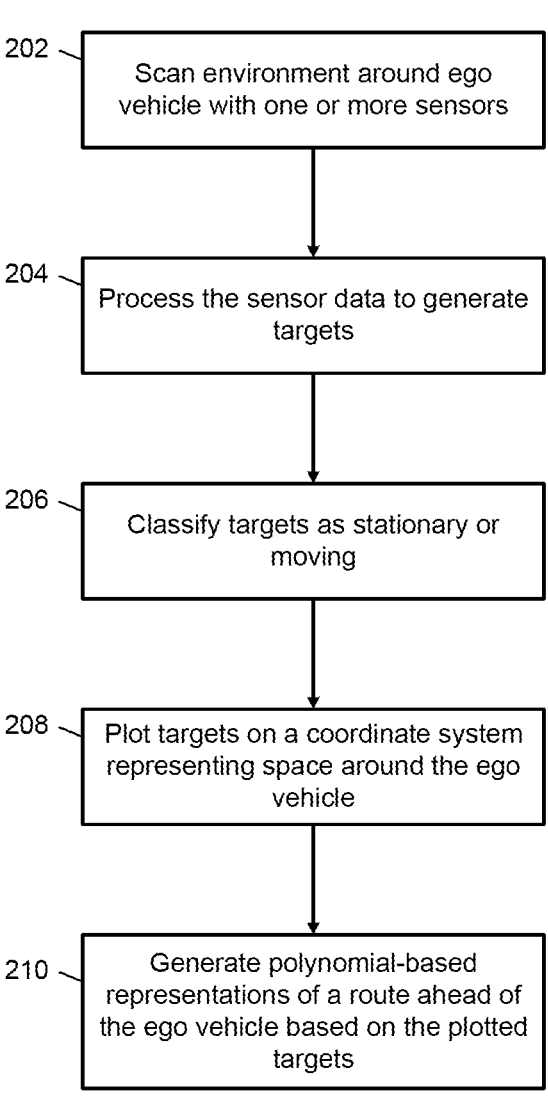

FIG. 2 is a flowchart of an example process 200 for automatically monitoring vehicle sensors 102 and generating a representation of a road ahead of the vehicle based on sensor data. At block 202, one or more vehicle sensors 102 scan an environment around an ego vehicle to generate sensor data. In various implementations, one or more vehicle sensors 102 scan the environment around the ego vehicle at regular intervals over a time period. For example, radars of radiolocation system 114 emit radio waves. Targets in the path of the radio waves may reflect the radio wave back to the radiolocation system 114. Moving targets may shift the frequency of the returned radio wave (according to the Doppler effect) relative to the target's velocity towards or away from the radiolocation system 114. In various implementations, one or more vehicle sensors 102 scan the environment using only radiolocation system 114. In other examples, one or more vehicle sensors 102 scan the environment using radiolocation system 114, light detection and ranging sensors 116, sonic sensors, electro-optical camera sensors 120, thermographic camera sensors 122, and/or time-of-flight sensors 124. Adaptive cruise control system control unit 104 receives the sensor data from the one or more vehicle sensors 102.

At block 204, adaptive cruise control system control unit 104 processes the sensor data to detect targets ahead of the ego vehicle. In some embodiments, adaptive cruise control system control unit 104 processes sensor data at regular intervals over a time period. In various implementations, the targets may represent other vehicles and/or objects ahead of the ego vehicle. In examples where the one or more vehicle sensors 102 scan the environment using radiolocation system 114, adaptive cruise control system control unit 104 determines distances to targets based on the times it takes for emitted radio waves to be reflected back to radiolocation system 114. Adaptive cruise control system control unit 104 may use the frequency shifts of the radio waves (due to the Doppler effect) to determine velocities of targets relative to the ego vehicle. Furthermore, adaptive cruise control system control unit 104 may use angular information from radiolocation system 114 to determine targets' positions relative to the ego vehicle's orientation.

At block 206, adaptive cruise control system control unit 104 classifies targets as stationary or moving. In some examples, adaptive cruise control system control unit 104 classifies targets at regular intervals over a time period. In implementations where the one or more vehicle sensors 102 scan the environment using radiolocation system 114, stationary targets such as parked other vehicles, guardrails, road signs, and/or trees) may produce a Doppler shift, but this shift will reflect the ego vehicle's own speed and direction. Adaptive cruise control system control unit 104 may classify targets having a Doppler shift matching the ego vehicle's velocity as stationary. By contrast, moving targets (such as other vehicles traveling on the road) may produce a Doppler shift that is a composite of both the ego vehicle and the target's velocities. Adaptive cruise control system control unit 104 may subtract the ego vehicle's velocity component to determine the moving target's motion relative to the ego vehicle.

At block 208, adaptive cruise control system control unit 104 plots targets on a coordinate system representing space around the ego vehicle. In some embodiments, adaptive cruise control system control unit 104 plots targets on the coordinate system at regular intervals over a time period. In examples where the one or more vehicle sensors 102 scan the environment using radiolocation system 114, radiolocation system 114 may detect multiple points for a single target. Adaptive cruise control system control unit 104 may apply a clustering algorithm to the detected multiple points to cluster groups of multiple points. Each cluster may represent an individual target. Each target may have one or more attributes such as its distance from the ego vehicle and its relative velocity (including direction) with respect to the ego vehicle. Adaptive cruise control system control unit 104 may determine where to plot each target on the coordinate system based on these attributes. In various implementations, the ego vehicle is moving and targets are generated and plotted. Thus, the plots may update for example, at regular intervals over the time period.

At block 210, adaptive cruise control system control unit 104 generates polynomial-based representations of a route ahead of the ego vehicle based on the plotted targets. In various implementations, adaptive cruise control system control unit 104 generates polynomial-based representations of the route at regular intervals over a time period. For example, adaptive cruise control system control unit 104 uses polynomial regression techniques such as the least squares method to fit a curve to the targets plotted on the coordinate system. The plotted curves may be expressed as polynomials and may represent the road ahead of the vehicle. Adaptive cruise control system control unit 104 may determine whether and how much the road ahead of the ego vehicle curves based on the plotted curves and/or their polynomial representations.

Figure 3:
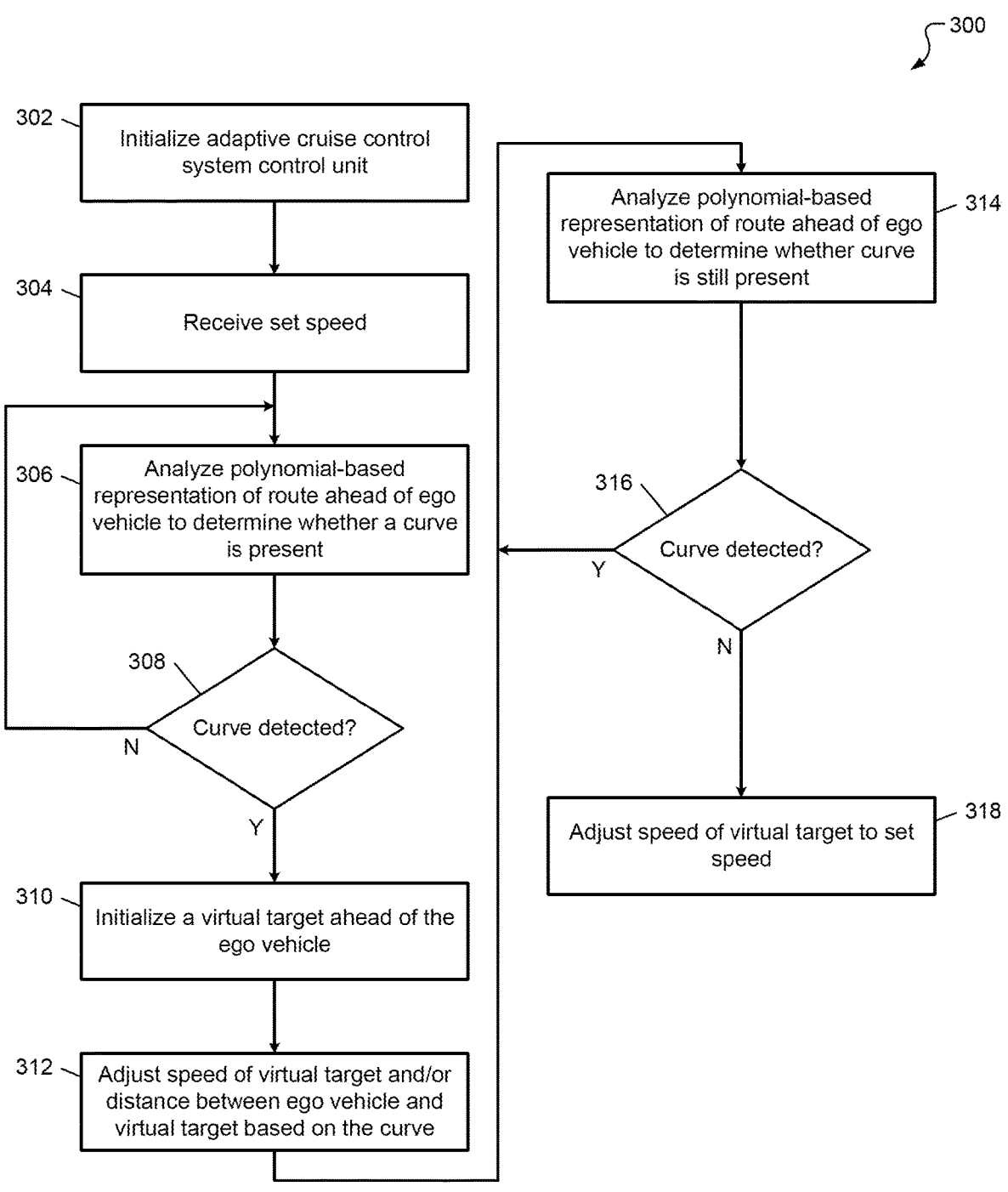
FIG. 3 is a flowchart of an example process for automatically monitoring a representation of a road ahead of a vehicle and adjusting a speed of the vehicle according to the representation.

FIG. 3 is a flowchart of an example process 300 for automatically monitoring a representation of a road ahead of a vehicle and adjusting a speed of the vehicle according to the representation. At block 302, an operator of the vehicle initializes the adaptive cruise control system control unit 104. At block 304, adaptive cruise control system control unit 104 receives a set speed. In various implementations, the set speed may be a speed set by the operator as a desired cruising speed for the vehicle. The set speed may represent the speed adaptive cruise control system control unit 104 commands vehicle electronic control unit 106 to maintain in an absence of obstacles in the ego vehicle's path or curves ahead of the ego vehicle. At block 306, adaptive cruise control system control unit 104 analyzes the polynomial-based representation of the route ahead of the ego vehicle to determine whether a curve is present. In various implementations, the polynomial-based representation of the route ahead of the ego vehicle is generated according to previously described process 200.

In response to adaptive cruise control system control unit 104 not detecting a curve ahead of the ego vehicle ("NO" at decision block 308), adaptive cruise control system control unit 104 monitors the polynomial-based representation of the route ahead of the ego vehicle to determine whether a curve is present at block 306. In response to adaptive cruise control system control unit 104 detecting a curve ahead of the ego vehicle ("YES" at decision block 308), adaptive cruise control system control unit 104 initializes a virtual target ahead of the ego vehicle at block 310. In various implementations, adaptive cruise control system control unit 104 attempts to match the speed of a target ahead of the ego vehicle and/or maintain a following distance between the target and the ego vehicle. Adaptive cruise control system control unit 104 may use a virtual target in place of a real detected target to produce smoother and/or more natural driving commands. For example, to slow the ego vehicle down, adaptive cruise control system control unit 104 may place the virtual target ahead of the ego vehicle and decrease the virtual target's speed and/or decrease the distance between the ego vehicle and the virtual target. Adaptive cruise control system control unit 104 may attempt to maintain the virtual target's decreased speed and/or increase the distance between the ego vehicle and the vehicle target by commanding vehicle electronic control unit 106 to slow the ego vehicle down.

In various implementations, vehicle electronic control unit 106 commands throttle control system 144 to modify the torque output of the engine to reduce the speed of the ego vehicle. For example, throttle control system 144 can reduce an amount of air entering the engine by adjusting the throttle valve or electronic throttle body. This reduced air intake may cause a reduction in engine power output, leading to deceleration of the ego vehicle. In some embodiments, throttle control system 144 retards or delays the ignition timing (so that the air-fuel mixture's ignition occurs slightly later in the combustion cycle). This may reduce the engine's efficiency, producing less power and creating a drag effect to slow the ego vehicle. In various implementations, throttle control system 144 cuts off the fuel supply to some or all cylinders. Without fuel combustion, the cylinders act as air pumps, creating resistance against the car's momentum and slowing the vehicle. In some embodiments, vehicle electronic control unit 106 commands brake control system 146 to increase braking pressure on the brakes (such as the front and/or rear brakes) of the ego vehicle. In some examples, vehicle electronic control unit 106 commands transmission control system 148 to downshift, which increases the engine's rotational speed without causing a corresponding increase in vehicle speed. This may result in engine braking effects.

Similarly, to increase the speed of the ego vehicle, adaptive cruise control system control unit 104 may increase the speed of the virtual target and/or increase the distance between the virtual target and the ego vehicle. In response, adaptive cruise control system control unit 104 may command vehicle electronic control unit 106 to increase the speed of the ego vehicle to match the speed of the virtual target and/or decrease the distance between the virtual target and the ego vehicle. In various implementations, adaptive cruise control system control unit 104 may—after slowing the ego vehicle below the set speed increase the speed of the ego vehicle by removing the virtual target. In response, adaptive cruise control system control unit 104 commands vehicle electronic control unit 106 to increase the speed of the ego vehicle to the set speed.

At block 312, adaptive cruise control system control unit 104 adjusts the speed of the virtual target and/or the distance between the virtual target and the ego vehicle based on the curve. For example, the adaptive cruise control system control unit 104 predicts an optimal speed for the ego vehicle to enter and travel through the curve. In various implementations, the distance between the virtual target and the ego vehicle may be set to the programmed following distance (e.g., the distance adaptive cruise control system control unit 104 attempts to maintain between the ego vehicle and a target the ego vehicle is following) and the speed of the virtual target may be set to the optimum speed. The adaptive cruise control system control unit 104 may reduce based on a distance between the virtual target and the beginning of the curve the speed of the virtual target so that it enters the curve at the optimum speed. In response, adaptive cruise control system control unit 104 may command vehicle electronic control unit 106 to reduce the speed of the ego vehicle to match the reduced speed of the virtual target while maintaining the following distance between the ego vehicle and the virtual target.

At block 314, adaptive cruise control system control unit 104 analyzes the polynomial-based representation of the route ahead of the ego vehicle to determine whether the curve is still present ahead of the ego vehicle. In response to adaptive cruise control system control unit 104 determining that the curve is still present ("YES" at decision block 316), adaptive cruise control system control unit 104 analyses the polynomial-based representation of the route ahead of the ego vehicle to determine whether the curve is still present at block 314. In response to adaptive cruise control system control unit 104 determining that the curve is no longer present ("NO" at decision block 316), adaptive cruise control system control unit 104 adjusts the speed of the virtual target by increasing the speed to the set speed (at block 318). Adaptive cruise control system control unit 104 may command vehicle electronic control unit 106 to increase the speed of the ego vehicle to match the increased speed of the virtual target while maintaining the following distance between the ego vehicle and the virtual target. In various implementations, adaptive cruise control system control unit 104 removes the virtual target and commands vehicle electronic control unit 106 to increase the speed of the ego vehicle to match the set speed.

Figure 4A:
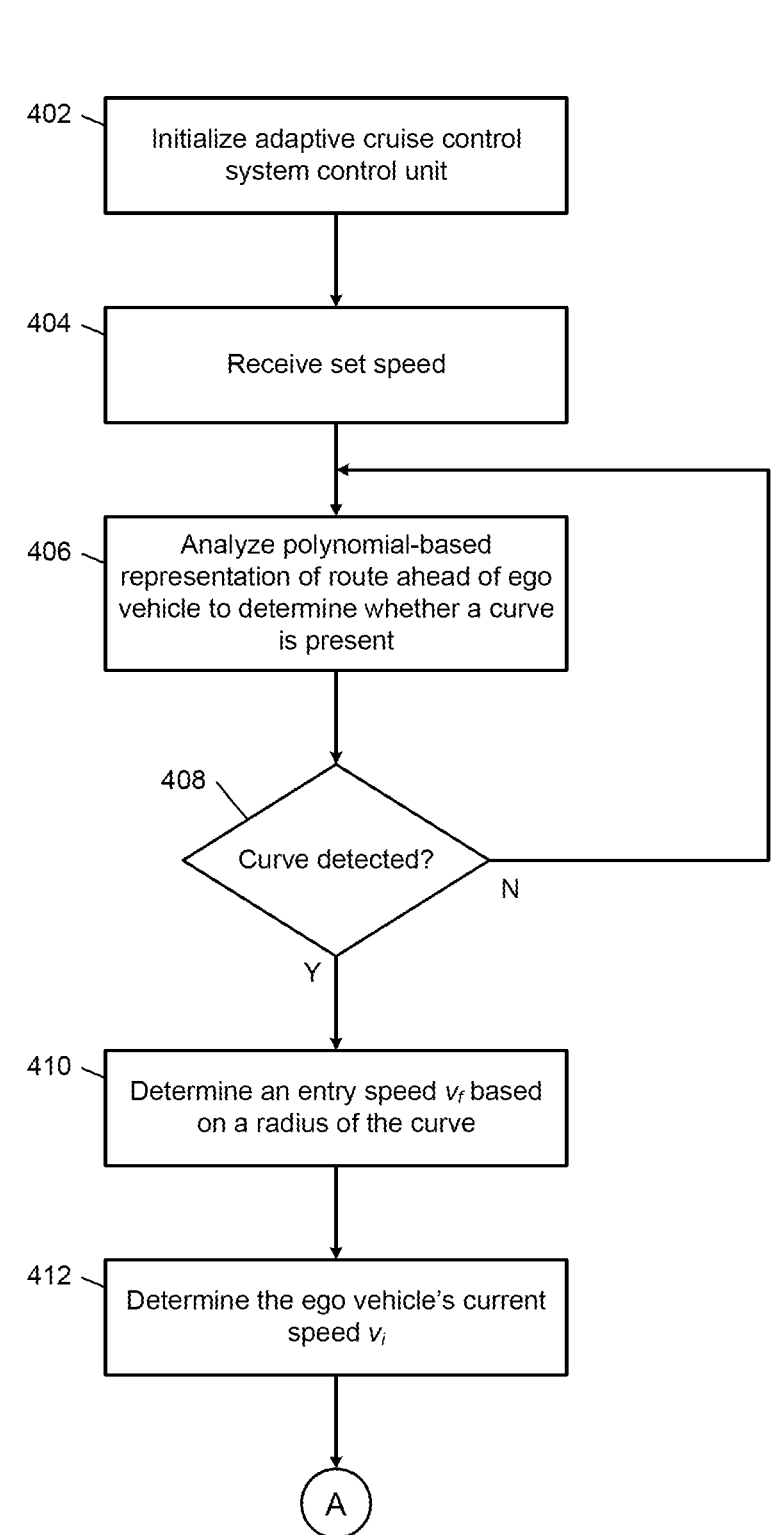
FIGS. 4A-4B are flowcharts of an example process for automatically monitoring a representation of a road ahead of a vehicle and adjusting a speed of the vehicle according to the representation.
Figure 4B:
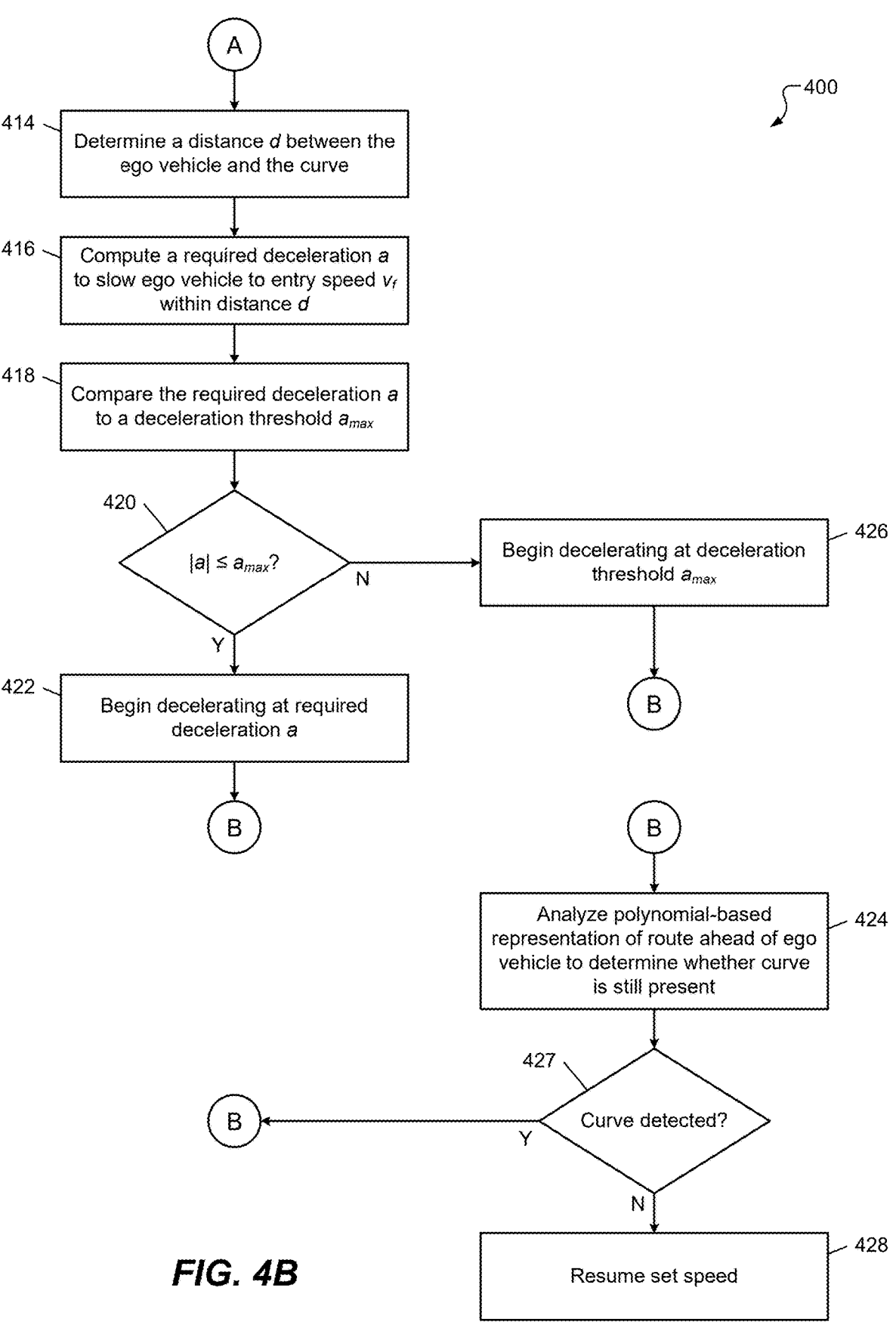

FIGS. 4A-4B are flowcharts of an example process 400 for automatically monitoring a representation of a road ahead of a vehicle and adjusting a speed of the vehicle according to the representation. At block 402, an operator of the vehicle initializes the adaptive cruise control system control unit 104. At block 404, adaptive cruise control system control unit 104 receives a set speed. In various implementations, the set speed may be a speed set by the operator as a desired cruising speed for the vehicle. The set speed may represent the speed adaptive cruise control system control unit 104 commands vehicle electronic control unit 106 to maintain in an absence of obstacles in the ego vehicle's path or curves ahead of the ego vehicle. At block 406, adaptive cruise control system control unit 104 analyzes the polynomial-based representation of the route ahead of the ego vehicle to determine whether a curve is present. In various implementations, the polynomial-based representation of the route ahead of the ego vehicle is generated according to previously described process 200.

In response to adaptive cruise control system control unit 104 not detecting a curve ahead of the ego vehicle ("NO" at decision block 408), adaptive cruise control system control unit 104 monitors the polynomial-based representation of the route ahead of the ego vehicle to determine whether a curve is present at block 406. In response to adaptive cruise control system control unit 104 detecting a curve ahead of the ego vehicle ("YES" at decision block 408), adaptive cruise control system control unit 104 determines an entry speed of based on a radius of the curve (at block 410). In various implementations, adaptive cruise control system control unit 104 selects the entry speed of from a lookup table. In other examples, adaptive cruise control system control unit 104 calculates the entry speed of in real time. At block 412, adaptive cruise control system control unit 104 determines the ego vehicle's current speed vi. At block 414, adaptive cruise control system control unit 104 determines a distance d between the ego vehicle and the start of the curve.

At block 416, adaptive cruise control system control unit 104 computes a required deceleration α to slow the ego vehicle to entry speed of within distance d. For example, adaptive cruise control system control unit 104 computes a according to equations (1) and (2) below.

$$v_f^2 = v_i^2 + 2ad \quad (1)$$

$$a = \frac{v_f^2 - v_i^2}{2d} \quad (2)$$

At block 418, adaptive cruise control system control unit 104 compares the computed required deceleration α to a deceleration threshold $\alpha_{max}$. In response to adaptive cruise control system control unit 104 determining that an absolute value of the computed threshold |α| is less than or equal to the deceleration threshold $\alpha_{max}$ ("YES" at decision block 420), adaptive cruise control system control unit 104 commands vehicle electronic control unit 106 to decelerate the ego vehicle at required deceleration α at block 422 and process 400 proceeds to block 424.

In response to adaptive cruise control system control unit 104 determining that the absolute value of the computed threshold |α| is not less than or equal to the deceleration threshold $\alpha_{max}$ ("NO" at decision block 420), adaptive cruise control system control unit 104 commands vehicle electronic control unit 106 to decelerate the ego vehicle at the deceleration threshold $\alpha_{max}$ at block 426 and process 400 proceeds to block 424. At block 424, adaptive cruise control system control unit 104 analyzes the polynomial-based representation of the route ahead of the ego vehicle to determine whether the curve is still present. In response to adaptive cruise control system control unit 104 determining that the curve is still present ("YES" at decision block 427), adaptive cruise control system control unit 104 analyzes the polynomial-based representation of the route ahead of the ego vehicle to determine whether the curve is still present at block 424. In response to adaptive cruise control system control unit 104 determining that the curve is no longer present ("NO" at decision block 427), adaptive cruise control system control unit 104 commands vehicle electronic control unit 106 to accelerate the ego vehicle to the set speed (at block 428).

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more steps within any given method may be executed in a different order or steps may be executed concurrently without altering the principles of this disclosure. Similarly, instructions stored in a non-transitory computer-readable medium may be executed in a different order or concurrently without altering the principles of this disclosure. Unless otherwise indicated, the numbering or other labeling of instructions or method steps is done for convenient reference and does not necessarily indicate a fixed sequencing or ordering.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

Spatial and functional relationships between elements such as modules are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element.

The term computer-readable medium does not encompass transitory electrical or electromagnetic signals or electromagnetic signals propagating through a medium such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device, or they may be distributed among different computing devices such as computing devices interconnected by one or more networks or other communications systems.

In the claims, if an apparatus or system is claimed as including an electronic processor or other element configured in a certain manner, the claim or claimed element should be interpreted as meaning one or more electronic processors (or other element as appropriate). If the electronic processor (or other element) is described as being configured to make one or more determinations or one or execute one or more steps, the claim should be interpreted to mean that any combination of the one or more electronic processors (or any combination of the one or more other elements) may be configured to execute any combination of the one or more determinations (or one or more steps).

What is claimed is:

1. A controller for a motor vehicle, the controller comprising:

an electronic processor configured to:
　receive sensor data from one or more sensors,
　process the sensor data to generate targets indicative of objects around the motor vehicle,
　plot the targets on a coordinate system representing space around the motor vehicle,
　generate a representation of a route ahead of the vehicle based on the plotted targets,
　analyze the representation of the route to determine whether a curve in a road is present ahead of the motor vehicle, and
　in response to determining that the curve is present, generate an instruction to reduce a speed of the motor vehicle by:

generating a virtual target ahead of the motor vehicle,
generating a command to follow the virtual target and maintain a fixed distance between the motor vehicle and the virtual target, and
reducing a speed of the virtual target according to a deceleration rate computed based on a distance between the motor vehicle and a beginning of the curve,
wherein the instruction to reduce the speed of the motor vehicle includes (i) increasing a brake pressure, (ii) modifying a torque output of an engine to decrease the speed of the motor vehicle, or (iii) a combination thereof.

2. The controller of claim 1, wherein generating instructions to reduce the speed of the motor vehicle comprises reducing a speed of the virtual target to a first speed, wherein the first speed is less than a current speed of the motor vehicle.

3. The controller of claim 2, wherein the first speed is determined based on a radius of the curve.

4. The controller of claim 1, wherein the representation of the route is a polynomial representation.

5. The controller of claim 1, wherein the electronic processor is configured to classify each target as stationary or moving.

6. The controller of claim 5, wherein the one or more sensors includes a radar sensor and classifying each target as stationary or moving includes classifying each target based on a Doppler shift of the target.

7. A method for controlling a motor vehicle, the method comprising:

processing sensor data to generate targets indicative of objects around the motor vehicle,
plotting the targets on a coordinate system representing space around the motor vehicle,
generating a representation of a route ahead of the vehicle based on the plotted targets,
analyzing the representation of the route to determine whether a curve in a road is present ahead of the motor vehicle, and
in response to determining that the curve is present, generating an instruction to reduce a speed of the motor vehicle by:
　generating a virtual target ahead of the motor vehicle,
　generating a command to follow the virtual target and maintain a fixed distance between the motor vehicle and the virtual target, and
reducing a speed of the virtual target according to a deceleration rate computed based on a distance between the motor vehicle and a beginning of the curve,
wherein the instruction to reduce the speed of the motor vehicle include (i) increasing a brake pressure, (ii) modifying a torque output of an engine to decrease the speed of the motor vehicle, or (iii) a combination thereof.

8. The method of claim 7, wherein generating instructions to reduce the speed of the motor vehicle comprises reducing a speed of the virtual target to a first speed, wherein the first speed is less than a current speed of the motor vehicle.

9. The method of claim 8, wherein the first speed is determined based on a radius of the curve.

10. The method of claim 7, wherein the representation of the route is a polynomial representation.

11. The method of claim 7, further comprising classifying each target as stationary or moving.

12. The method of claim 11, wherein processing the sensor data includes processing a radar sensor data and classifying each target as stationary or moving includes classifying each target based on a Doppler shift of the target.

* * * * *